United States Patent [19]

Gates

[11] 4,390,479
[45] Jun. 28, 1983

[54] HUMIDIFYING SYSTEM FOR MOBILE VEHICLES

[76] Inventor: James T. Gates, 1611 Kirkley Rd., Columbus, Ohio 43221

[21] Appl. No.: 394,518

[22] Filed: Jul. 2, 1982

Related U.S. Application Data

[62] Division of Ser. No. 258,642, Apr. 29, 1981, Pat. No. 4,346,048.

[51] Int. Cl.³ .............................................. B60H 3/02
[52] U.S. Cl. ................. 261/27; 261/DIG. 4; 261/67; 239/67; 239/332
[58] Field of Search ............... 261/DIG. 4, 27, 67; 239/332, 67, 333; 98/2.11

[56] References Cited

U.S. PATENT DOCUMENTS

| | | | |
|---|---|---|---|
| 1,881,963 | 10/1932 | Perrin | 239/332 |
| 2,084,563 | 6/1937 | Scott | 261/27 |
| 2,770,896 | 11/1956 | Holmberg | 239/332 |
| 2,798,135 | 7/1957 | Graham | 261/27 |
| 3,164,971 | 1/1965 | Gentz | 98/2.11 |
| 3,219,796 | 11/1965 | Graf et al. | 219/362 |
| 3,307,835 | 3/1967 | Perlman | 261/27 |
| 3,510,252 | 5/1970 | Reich | 219/362 |
| 4,038,347 | 7/1977 | Mickley | 219/362 |
| 4,109,869 | 8/1978 | Brockelsby et al. | 239/333 |
| 4,154,375 | 5/1979 | Bippus | 239/332 |
| 4,238,425 | 12/1980 | Matsuoka et al. | 261/DIG. 4 |

FOREIGN PATENT DOCUMENTS

| | | | |
|---|---|---|---|
| 52-27138 | 1/1977 | Japan | 98/2.11 |
| 55-127215 | 10/1980 | Japan | 261/DIG. 4 |

Primary Examiner—Tim R. Miles
Attorney, Agent, or Firm—Millard & Cox

[57] ABSTRACT

A container of water is mounted on a motor vehicle and a pump means for dispensing that water into a passenger compartment of said vehicle is provided. The water will be delivered in the form of spray or vapor. An electrical circuit is formed with a humidity sensing device within the passenger compartment for purposes of actuating the vapor forming and dispensing apparatus.

2 Claims, 8 Drawing Figures

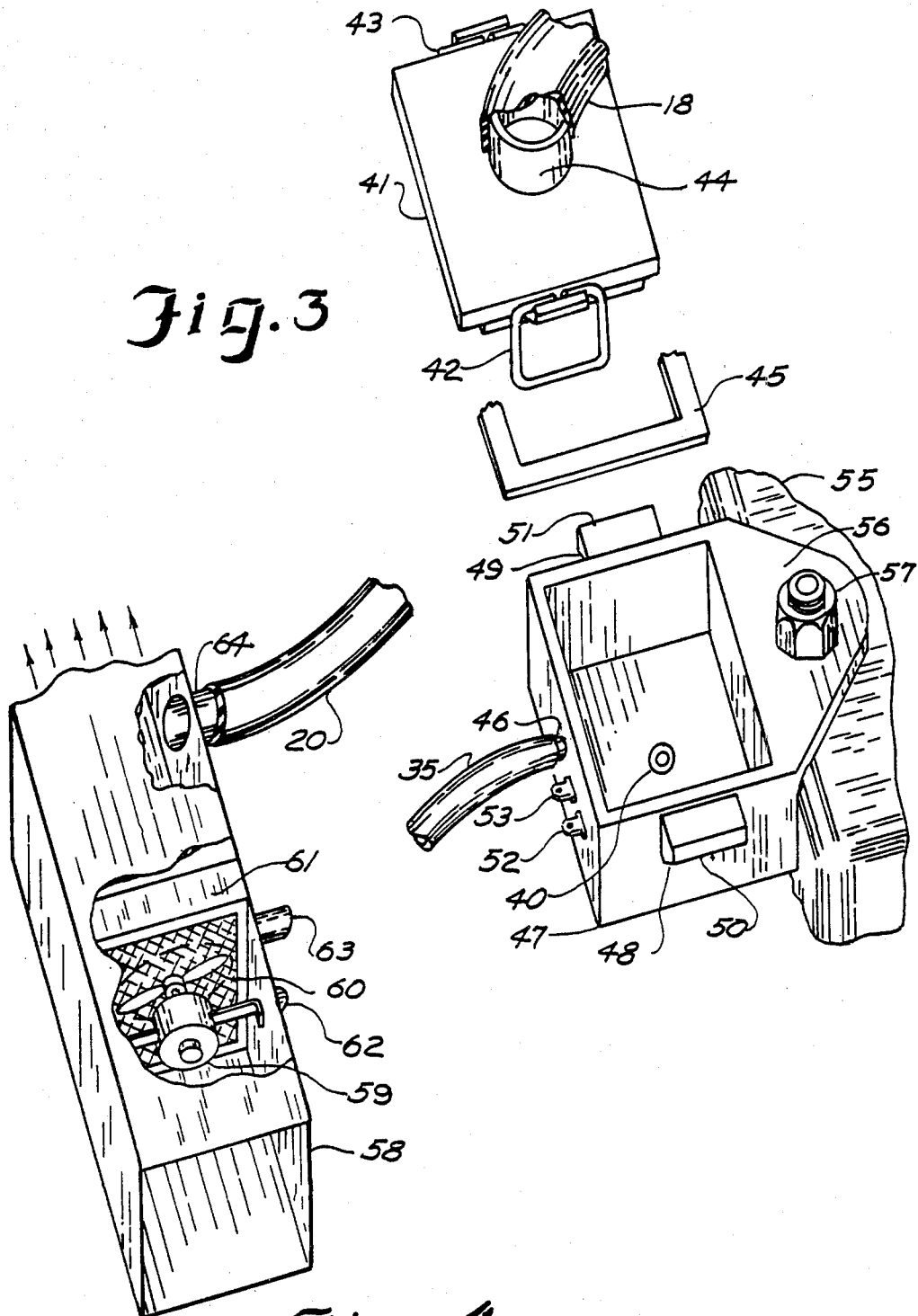

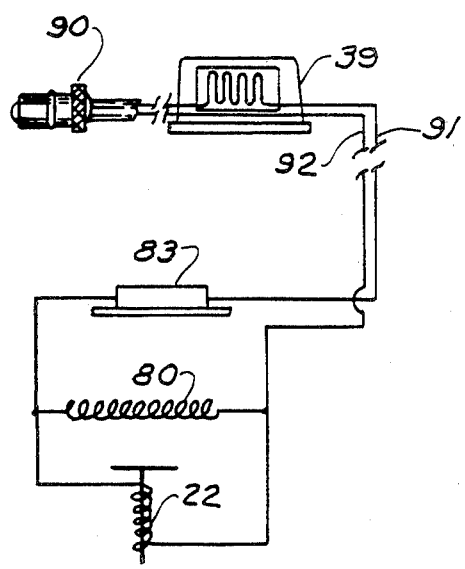
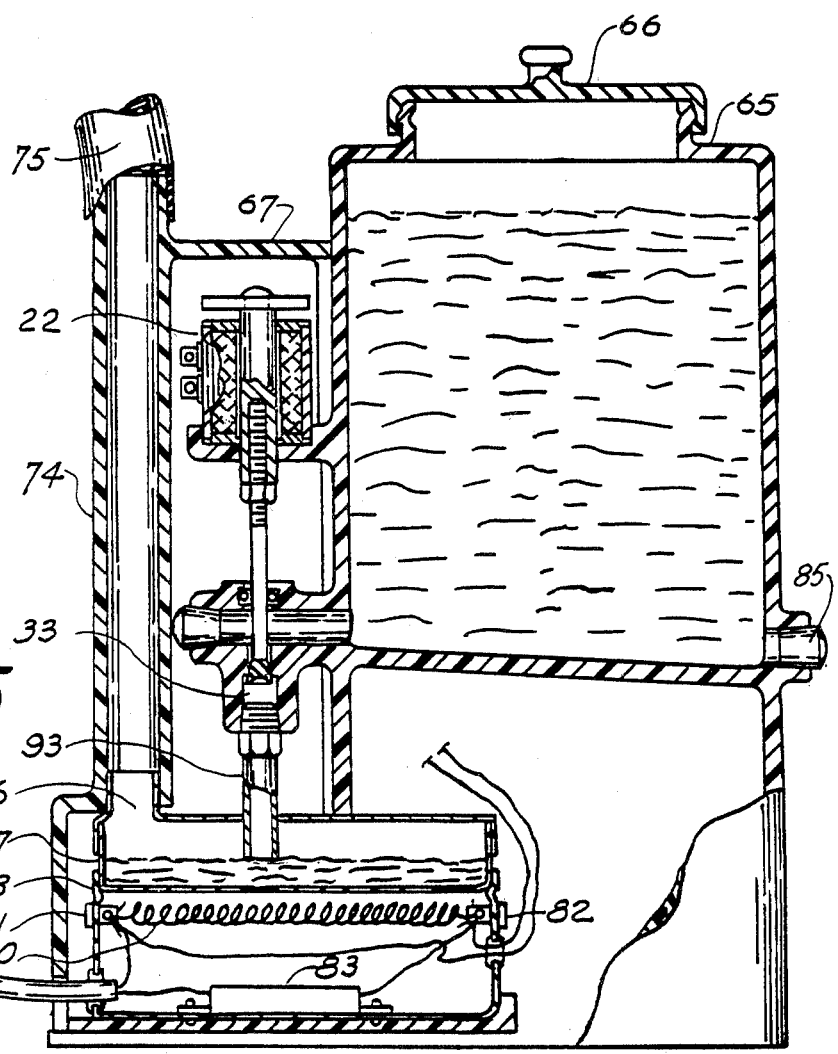
Fig. 6
Fig. 5

HUMIDIFYING SYSTEM FOR MOBILE VEHICLES

This application is a division of application Ser. No. 258,642, filed Apr. 29, 1981, now U.S. Pat. No. 4,346,048.

BACKGROUND OF THE INVENTION

The value of humidifiers in millions of American homes and offices is well known for preventing dry skin and noses, as well as an aid to preventing contraction of certain respiratory diseases. However, there are probably twice as many automobiles, trucks, and other conveyances as there are homes. Yet, no humidity system to alleviate this dry condition has been offered for cars, trucks, and other mobile units. A person may ride in a dry oven-type heated compartment in winter months where the relative humidity is often 10 percent or less moisture than in the Sahara Desert. There are many truck drivers who spend eight hours, or so, in such an atmosphere during their daily working periods.

A typical experiment verifies this dry condition. A humidiguide indicator placed in a passenger car in the winter months when the outside temperature is between 20° F. and 30° F. may indicate a relative humidity of between 30 and 40 percent. The car is driven for fifty minutes with the car heater temperature set at 72° F. The air circulating through the car heater now shows the relative humidity to be down to 10 to 15 percent.

Repeating the same experiment while adding moisture to the car by means of a hydrometeor, the humidiguide indicator may be kept at about 40 percent relative humidity.

The surprising thing, which has probably kept inventors from offering such a system, is that one would expect the windows to fog up, but they do not, due to the high volume of air circulating through the heater duct system and the allowable moisture at a given temperature. At a barometric pressure of 30 inches of mercury and a temperature of 72° F., the weight of moisture necessary to produce 40 percent relative humidity is only 3.2 grains of moisture per cubic foot. In layman's terms, this is less than seven thousandths of an ounce.

All currently available inexpensive humidity indicating instruments have a certain lag response time; however, as one can imagine, as in the example given, if it takes 50 minutes of 72° F. circulating air to reduce the indicating humidiguide to 10 percent relative humidity, the moisture replacement necessary to meet the aim of this invention is not a large quantity. A water dispensing container of one liter would probably meet most needs to provide a sufficient period of time before refilling.

The novel apparatus of the instant invention may be installed in a mobile vehicle in either one of three different ways. These three methods show how a controlled quantity of water varpor can be maintained to satisfy a set relative humidity in a vehicle, either by means of evaporation using one of several hot areas of the vehicle; use of a unit heater powered by battery wattage; or by a mechanical pressure release system using a D.C. motor. To meet these aims, a number of objectives are claimed as follows:

The principal objective of the present invention is to provide a controlled relative humidity system for mobile vehicles such as cars, trucks, buses, trains, and the like.

Another objective is to provide a suitable water vessel with integral controlled water and vapor valve inlets and outlets.

Another object of the invention is to provide a controlled moisture dispensing system that discharges vapor directly into the conventional heating duct of the vehicle.

Another objective is to provide a controlled flow of water from a main liquid container to a smaller vessel located in one of the hot zones of the vehicle for the purpose of converting water to steam or vapor.

Another objective is to provide a simplified modular system using a battery heater for convering the controlled flow of water to vapor.

Another objective is to include an electrical circuit and humidity control which holds the desired preset percentage of relative humidity in the driver and/or passenger compartments.

Another objective is to provide an electrical and humidity control circuit which functions only in the "on" position when related conditions of all associated elements are in the correct mode of influence.

Another objective is to provide a portable, completely self-contained, automatic moisture regulating and dispensing unit that can be plugged into the cigarette lighter receptacle of the vehicle.

Another objective of my invention is to provide an even more simplified self-contained, portable system for controlling relative humidity in a vehicle, that also gets its power from a plug-in arrangement using the cigarette lighter receptacle, and vaporizes moisture by a motor-driven pressure pump.

To sustain a relative humidity in the cab of a truck or car at between 30 and 40 percent is the objective of my invention to provide better health and comfort for winter driving. With this objective in mind, details of my humidifying system for mobile transportation units is hereby disclosed. Other objectives of the invention will become apparent as one studies the description of the preferred embodiments and the respective diagrammatic drawings.

BRIEF DESCRIPTION OF THE DRAWINGS

FIG. 3 is an exploded view of a water heating container attached to a motor block according to this invention;

FIG. 4 is a partial sectional view of an existing vehicle heating duct showing a heating radiator and fan and including a vapor hose connection duct at the top right according to this invention;

FIG. 5 is a cross sectional view of an alternative humidity control unit which is portable and powered by a connection with the cigar lighter;

FIG. 6 is a circuit diagram for the portable unit of FIG. 5;

DESCRIPTION OF THE PREFERRED EMBODIMENTS

Figure 1:
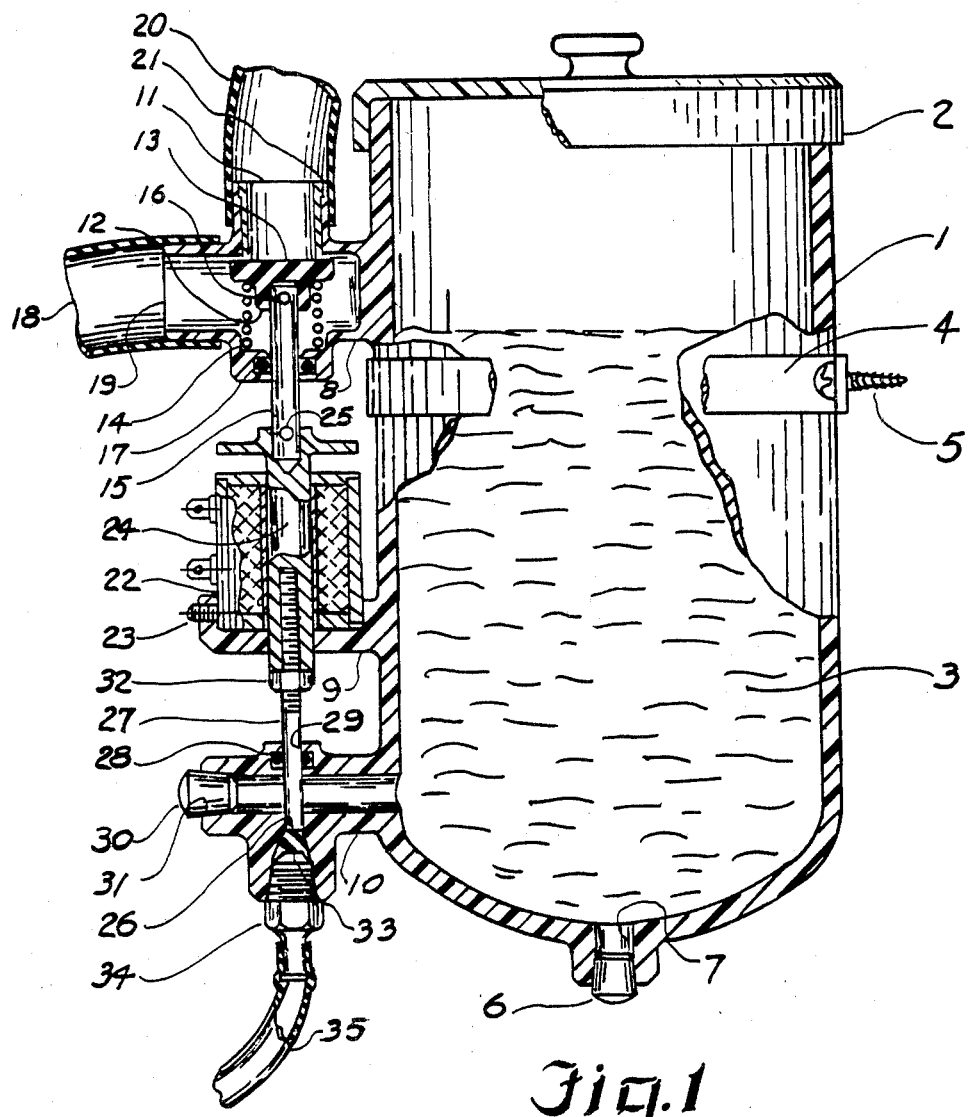
FIG. 1 is a section of the main operating moisture dispensing unit and control valves of my invention.

FIG. 1 shows a partial sectional view of a water container 1 with a removable seal lid 2. The container is designed to store water in the winter season and antifreeze should not be added; accordingly the unit and its associated water conducting components would be made of a flexible material such as polyvinylchloride to accommodate possible freezing and thawing without damage to the equipment. The water container may be located in any convenient area of the vehicle, but preferably under the hood, in the engine compartment. The container 1 normally is filled with water 3 and is generally supported in place by a bracket 4 and held in place by at least two screws 5. A rubber stopper 6 in the drain port 7 of the container allows the unit to be drained for easy cleaning or any other desirable reason.

Three appendages 8, 9 and 10 extend horizontally from container 1 and preferably are an integral part of the container, but could be separate units. Appendage 8 comprises an L-shaped duct housing a valve to control the flow of water vapor and is installed with a press fit valve seat cylinder 11, a seal carrier adapter 12, and a rubber seal disk 13. Seal disk 13 is held against valve seat cylinder 11 by means of a helical compression spring 14. Valve actuator rod 15 is attached to seal carrier adapter 12 by a roll pin 16. An "O"-ring seal 17 keeps vapor from escaping around valve actuator rod 15. Flexible tubing 18 is attached to the inlet 19 of appendage 8 and flexible tubing 20 is attached to the outlet 21. Vapor from another source, to be explained later, enters inlet 19 and when the adapter 12 is retracted, exits through outlet port 21.

Appendage 9 houses a solenoid 22 held in place by set screw 23. Solenoid or actuator 22 has a special plunger 24 attached to valve actuator rod 15 by roll pin 25. Humidity sensing units control the operation of solenoid 22 which, in turn, opens and closes the valve in appendage 8.

Appendage 10 comprises a duct for the exit of water 3 from container 1 and a valving arrangement controlled by solenoid 22 operates to stop and start gravity flow. A valve stem 27 has initially been inserted through "O"-ring 28 which prevents leakage around the stem at port 29. Locknut 32 secures adjusted valve stem 27 in place after it has been threaded into plunger 24.

The lower end of stem 27 has a circular rubber seal tip 33 which seals port 26 when plunger 24 is in the unenergized position. A hose bib 34 is threaded into the duct of appendage 10 and a hose 35 is pulled over the hose bib to conduct water when the valve is open.

Figure 2:
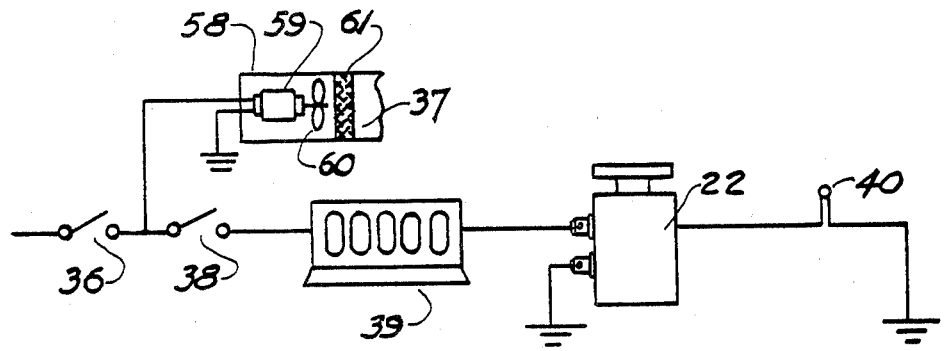
FIG. 2 is a schematic representation of the electrical and moisture sensing circuit that controls the moisture dispensing unit; shown in FIG. 1.

FIG. 2 illustrates the control circuit which actuates the humidifying system of FIG. 1. In order for the system to function, heater switch 36 to heater system 37 must be turned on. Humidity switch 38 must also be in the "ON" position. A humidity sensing device 39 may be located within the passenger compartment of the vehicle and may be any one of several moisture sensing switches now available on the market. When the relative humidity is below a pre-set level of desired humidity, preferably 35 to 40 percent, the switch of the humidity sensing device transfers to the "ON" position.

The temperature of a water heating vessel, shown in FIG. 3, must be up to a pre-set temperature (about 175° F.) before thermistor 40 will pass current. When the four switches mentioned are closed, solenoid 22 will operate causing plunger 24 to descend thereby opening water valve 33 and vapor valve 13.

Turning now to FIG. 3, a lid 41 with locking ring clamps 42 and 43 is designed to be locked on top of vessel 47 and a seal ring 45 therebetween prevents vapor leakage. The top of the lid 41 has a vapor outlet port 44 over which a vapor outlet tube 18 is attached—this is the opposite end of tube 18 shown attached to inlet port 19 of appendage 8, FIG. 1.

Locking ring clamps 42 and 43 are slipped over the inclined planes 48 and 49 of the locking ears 50 and 51, respectively, and are held in place in undercut grooves juxtaposed to the sides of vessel 47. Thermister 40, mounted in the bottom of vessel 47, is a part of the control circuit as explained in the description of FIG. 2. Insulated electrical terminals 52 and 53 are connected to thermister 40, which conducts current only when the water heating vessel reaches a predetermined temperature (175° F.). Water entrance hose 35 supplies water to water heating vessel 47 through port 46—this is the opposite end of the same tube 35 shown attached to water outlet port hose bib 34 of appendage 10, FIG. 1. Water heating chamber vessel 47 is attached to an appropriate vehicle hot zone 55 by means of flange 56 with nut 57.

The representative conventional heater duct 58, FIG. 4, also shows fan motor 59 and fan 60 which normally circulates vehicle compartment air through the heater 61. Conventional heater temperature circulating fluid ports 62 and 63 are shown attached to the heater for clarity but are not a part of this invention. Entrance port 64 leads into duct 58 downstream of heater 61. Attached to port 64 is vapor inlet tube 20—this is the opposite end of the same vapor outlet tube 20 shown attached to outlet port 21 of appendage 8, FIG. 1, and is the only attachment necessary to the conventional heater system of the vehicle.

It can now be seen that as the control switches of FIG. 2 close, solenoid 22 of FIG. 1 operates to open the water metering valve 33, allowing water to pass to water heater vessel 47, FIG. 3. Means are not shown in the drawings to prevent the overflow of heater vessel 77 when valve 33 is open as shown in FIG. 1. Means for accomplishing the obvious need to prevent overflow could be achieved in innumerable ways which would be obvious to those having ordinary skill in the art. Water in vessel 47 is heated into vapor, transferring through lid 41, tube 18, thence to inlet port 19, appendage 8, FIG. 1. Valve port 21, now being open by action of solenoid 22, allows vapor to pass through tube 20 to the vehicle heater duct 58 at inlet port 64 providing moisture to the existing conventional heater air circulating system. When the humidity sensor 39 is satisfied in reaching the desired percentage of pre-set level of relative humidity, the humidity sensing device deenergizes the operating solenoid 22 and vapor supply to the humidifying system discontinues until the level of relative humidity goes below the pre-set point. Obviously, a slow leak may be provided at valve 13 to prevent excessive pressure buildup in the system between vessel 47 and valve 13 when water in vessel 47 is hot and the humidity is above the preset level and valve 13 is closed.

FIGS. 5 and 6 show a much simpler and easier to install portable version of the invention that can be plugged into a cigar lighter of a car or truck. The housing is made up of three sections; namely, the reservoir 65, lid 66, and vapor shroud 67. The shroud and reservoir may be formed integrally, separately or a combination of both. Obviously, the way it is formed and located still will not affect the operation of the apparatus. It is shown as housed in a single container because it is the preferred embodiment.

Shroud 67 has an integral duct 74 leading to an extension hose 75, if required. The duct 74 may simply discharge water vapor directly into the passanger compartment if it is physically located in the passssenger compartment. The solenoid 22 and metered water valve 33 are the same as previously described in FIG. 1. Vapor spout 74 extends from aperture 76 in the top of water pan 77. Pan 77 is located atop a housing 78 which contains a heater coil 80 and a heat control unit 83. Said heater coil is mounted on insulator inserts 81 and 82. A drain plug 85 may be installed similarly to plug 6 in FIG. 1.

FIG. 6 is the control circuit of the simplier portable humidifier of FIG. 5, in which cigar lighter receptical 90 supplies D.C. voltage to the humidity sensor switch 39. Positive D.C. line 91 out of sensor switch 39 runs in series through the bimetal temperature control unit, thence to solenoid 22 and heater 80. The negative D.C. line 92 is attached to the opposite side of heater 80 and solenoid 22.

When humidity sensor switch 39 is in the "ON" position, calling for moisture, solenoid 22 opens valve 33 allowing a quanity of water to fill water pan 77 through spout 93. The water level never rises higher than the lower end of water spout 93 because container 65 is air tight and unless air bubbles up through spout 93 into container 65 a vacuum will form which will hold the water in place is the manner of a conventional water bottle of a drinking fountain in many business offices.

Heater 80 brings the water in chamber or pan 77 to a controlled temperature of 160° F. to 170° F., causing vapor moisture to rise out of vapor spout 74. When humidity sensor switch 39 is statisfied, as to a pre-set level of relative humidity, current is discontinued and the humidifier ceases to function until more moisture is required.

Figure 7:
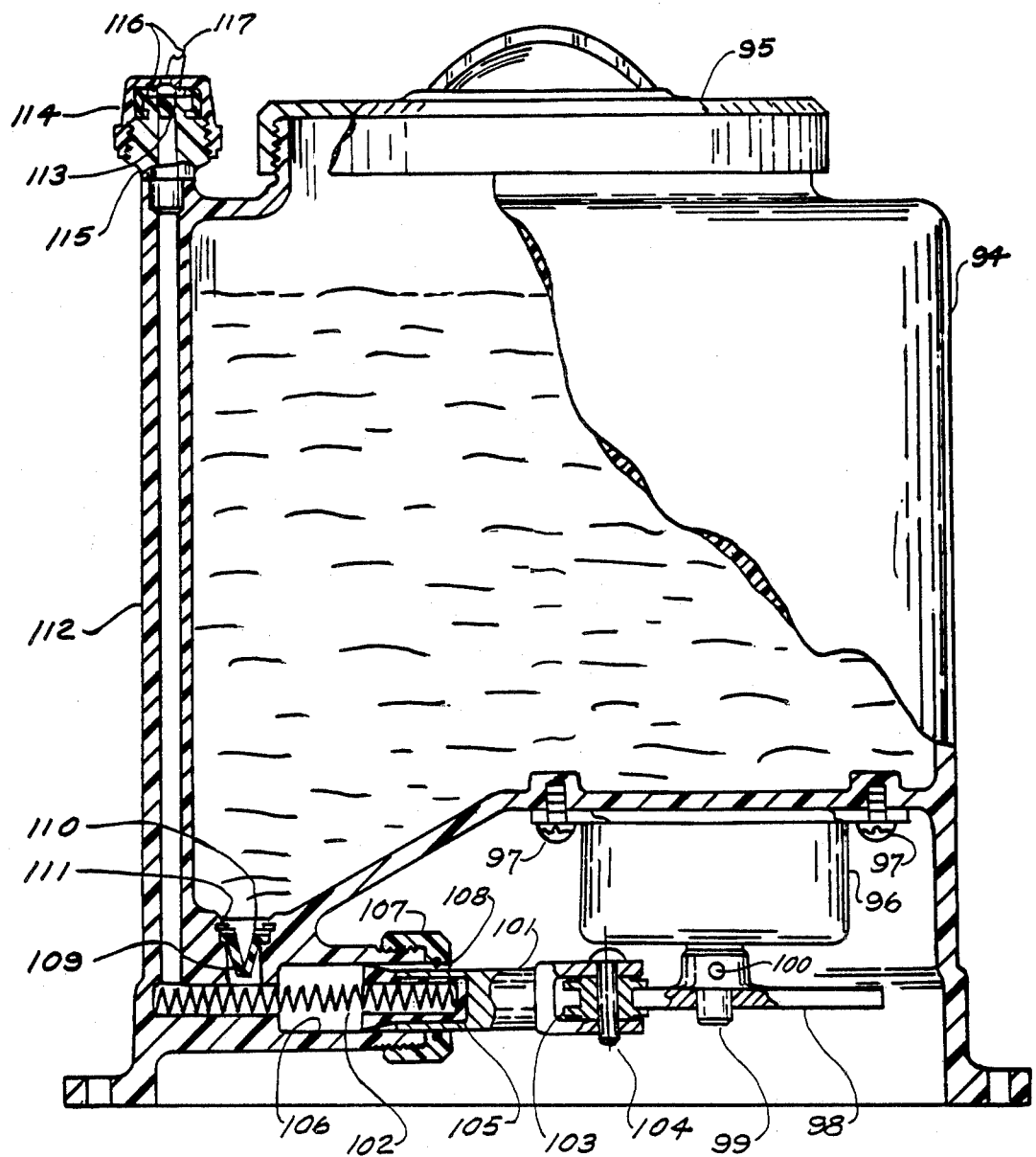
FIG. 7 is an elevational view, partially in section, of an alternative embodiment of my invention as illustrated in FIG. 1.

FIG. 7 is an even more simplified version of the invention in which the main container water supply source 94 includes lid 95. D.C. motor 96 is attached to the under carriage of water container 94 by two self-tapping screws 97. When the system calls for moisture, motor 96 rotates cam 98 which is attached to motor shaft 99 by roll pin 100. Cam 98 drives piston 101, which is returned and kept in continuous contact with cam 98 by compression spring 102. Piston 101 is installed with cam follower 103 which is held in place and allowed to rotate around pin 104. Piston 101 has a cup-shaped rubber seal insert 105 which reciprocates within a chamber cylinder 106 as a part of piston 101 and serves to provide a water tight seal with the interior surface of cylinder 106. Seal cap 107 and "O"-ring 108 complete the cylinder-piston assembly.

Unidirectional platypus intake valve 109 is held in place by spring washer 110 and retainer ring 111. On the back stroke (to the right in FIG. 7) of piston 101, water is sucked into cylinder 106 through unidirectional platypus valve 109. On the compression stroke of piston 101 water is forced up passage tube 112 to back pressure valve 113, which is held spray tight by cap 114. Threaded insert 115 is a bonded separate section for convenience of manufacture.

On the back stroke of piston 101, back pressure valve 113 closes outlet passage tube 112. On the forward pressure stroke of piston 101 valve 109 closes and valve 113 opens allowing water to pass through orifices 116 and valve 113. The tighter cap 114 is forced against orifices 116, the finer the vapor spray through orifice 117. The spray from orifice 117 will flow directly into the passenger compartment. Obviously, cap 95 will allow air leakage into container 94 to prevent a vacuum when water is withdrawn through valve 109.

Figure 8:
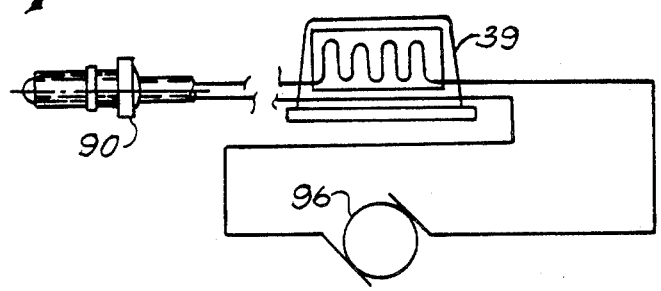
FIG. 8 is a circuit diagram for the unit of FIG. 7.

FIG. 8 is the control circuit for the above portable relative humidity system unit. Again 90 is the receptacle which may be plugged into the vehicle cigarette unit, relative humidity control switch 39 keeps the vehicle at a pre-set percentage of moisture, 96 is the D.C. drive motor.

I claim:

1. Apparatus for controlling the humidity of the passenger compartment of a vehicle, said compartment including a conventional cigar lighter outlet comprising, in combination:

a container for holding water, said container including an upper opening for filling purposes and a lower opening for discharge purposes, when inoperative condition:
  (a) the upper opening being closed by a lid which allows air to leak into the container,
  (b) said lower opening being closed by an undirectional platypus intake valve having means therein to prevent water from discharging except when the pressure within the container exceeds the pressure on the other side of the valve,
  (c) said lower opening leading into a passage, said passage leading to a cylinder, a reciprocal piston mounted within said cylinder and reciprocable by a motor and rotatable cam combination, said motor being controlled by a humidity sensing device and powered by electrical current from a plug inserted into said cigar lighter outlet, said humidity sensing device being connected in series with said motor, the motor, cam, piston combination when reciprocated in one direction causing water to be discharged from the cylinder and when reciprocated in the other direction creating a vacuum downstream of said valve which causes it to open and water to flow from the container into said cylinder, the water which is discharged from said cylinder being delivered through a duct to a spray nozzle which sprays a vapor into the compartment.

2. The apparatus of claim 1 including a second valve, said second valve being located in said duct intermediate said cylinder and said spray nozzle, said second valve being configured to seal the duct during the piston reciprocation which draws water from the container into the cylinder.

* * * * *